United States Patent
Teague

(10) Patent No.: US 8,466,412 B2
(45) Date of Patent: Jun. 18, 2013

(54) APPARATUS FOR REGISTRATION OF PHOTONS AND IONIZING PARTICLES WITH SIMULTANEOUS DIRECTIONAL DEFINITION, FOR EACH PHOTON OR IONIZING PARTICLE, OF A POINT OF ORIGIN IN A FLUID-FILLED CONDUIT

(75) Inventor: Phil Teague, Houston, TX (US)

(73) Assignee: Visuray Technology Ltd (MT)

(*) Notice: Subject to any disclaimer, the term of this patent is extended or adjusted under 35 U.S.C. 154(b) by 0 days.

(21) Appl. No.: 13/581,717

(22) PCT Filed: Mar. 22, 2011

(86) PCT No.: PCT/NO2011/000097
§ 371 (c)(1),
(2), (4) Date: Aug. 29, 2012

(87) PCT Pub. No.: WO2011/119040
PCT Pub. Date: Sep. 29, 2011

(65) Prior Publication Data
US 2012/0318992 A1 Dec. 20, 2012

(30) Foreign Application Priority Data

Mar. 25, 2010 (NO) .................................. 20100440

(51) Int. Cl.
*G01V 5/04* (2006.01)
*G01T 1/20* (2006.01)

(52) U.S. Cl.
USPC ........................................ 250/266; 250/366

(58) Field of Classification Search
USPC ............... 250/253, 265, 266, 363.01, 363.02, 250/363.03, 363.04, 363.1, 366, 367, 368, 250/370.09, 370.11
See application file for complete search history.

(56) References Cited

U.S. PATENT DOCUMENTS

| | | | |
|---|---|---|---|
| 3,167,653 A | 1/1965 | Rumble et al. | |
| 3,882,309 A | 5/1975 | Paap | |
| 3,970,853 A | 7/1976 | Kuhl et al. | |
| 4,220,851 A | 9/1980 | Whatley, Jr. | |
| 4,300,043 A | 11/1981 | Robbins | |
| 6,627,897 B1 | 9/2003 | Francke et al. | |
| 2010/0017134 A1 | 1/2010 | Steinman et al. | |

OTHER PUBLICATIONS

International Search Report and Written Opinion dated Jul. 4, 2011 issued in corresponding international patent application No. PCT/NO2011/000097.

*Primary Examiner* — Mark R Gaworecki
(74) *Attorney, Agent, or Firm* — Ostrolenk Faber LLP

(57) ABSTRACT

A detection apparatus (D) for photons or ionizing particles (P) is described, in which a detector system (11) is provided with several detecting units (11a), each including a scintillator (112) connected to a reader surface (111a) on an electronic charge reader (111), the scintillator (112) being arranged to generate cellular charges on the reader surface (111a) when capturing the photons or the ionizing particles (P), there being a collimator (113) arranged, connected to the scintillator (112) opposite the electronic charge reader (111), the collimator (113) being arranged to capture photons or ionizing particles (P') exhibiting a direction of motion coinciding with a longitudinal axis (A) of the collimator (113), and to reject photons or ionizing particles (P') exhibiting a direction of motion deviating from the direction of the longitudinal axis (A) of the collimator (113).

10 Claims, 4 Drawing Sheets

APPARATUS FOR REGISTRATION OF PHOTONS AND IONIZING PARTICLES WITH SIMULTANEOUS DIRECTIONAL DEFINITION, FOR EACH PHOTON OR IONIZING PARTICLE, OF A POINT OF ORIGIN IN A FLUID-FILLED CONDUIT

CROSS REFERENCE TO RELATED APPLICATIONS

The present application is a 35 U.S.C. §371 National Phase conversion of PCT/NO2011/000097, filed Mar. 22, 2011, which claims benefit of Norwegian Application No. 20100440, filed Mar. 25, 2010, the disclosure of which is incorporated herein by reference. The PCT International Application was published in the English language.

TECHNICAL FIELD OF THE INVENTION

The invention relates to a detection apparatus for photons or ionizing particles, in which a detector system is provided with several detecting units, each including a scintillator connected to a reader surface on an electronic charge reader, the scintillator being arranged to generate cellular charges on the reader surface when capturing the photons or the ionizing particles, more particularly by a collimator being arranged, connected to the scintillator opposite the electronic charge reader, the collimator being arranged to capture photons or ionizing particles exhibiting a direction of motion coinciding with the longitudinal axis of the collimator and to reject photons or ionizing particles exhibiting a direction of motion deviating from the direction of the longitudinal axis of the collimator.

BACKGROUND OF THE INVENTION

The prior art within borehole logging and data acquisition is based, to a great extent, on photomultiplier tubes or photodiodes connected to scintillator crystals such as potassium iodide or caesium iodide.

When an assembly of a scintillator crystal connected to a photomultiplier tube is exposed to ionizing radiation (such as X-, gamma or particle radiation), the incident radiation will be converted into non-ionizing, "optical" photons in the scintillator crystal through a process which includes scattering, nuclear recoil and/or fluorescence. The optical photons are then detected, that is to say counted, by means of the photomultiplier tube which is connected to the scintillator crystal. As mentioned above, the multiplier tube may be substituted with a photodiode for the same purpose.

A typical borehole application for such assemblies comprises borehole logging. In such assemblies it is desirable that the ionizing radiation should be as large as possible for the collection of photons to be the largest possible with a view to improving the statistical analyses of the data acquired and thereby reducing errors in the readings. For that reason and because of the cylindrical form that most tools for use in boreholes have, such a detector is typically formed as a cylindrical scintillator with a photomultiplier or a photodiode connected to one end of the scintillator. The concept consists in maximizing the collection in a unit volume of photons moving radially in towards the tool in a direction perpendicular to the longitudinal axis of the borehole. Even though scintillators are in general use, the scintillator has physical properties that do not make it well suited for maximum collection of inflowing photons. When an inflowing ionizing particle or a photon interacts with the scintillator material, the result is a yield of scintillated photons of less energy and with a resultant direction statistically distributed around the point of interaction, that is to say that the direction of the outgoing, optical photon is generally different from the direction of the incident photon, depending on the specific interaction between the photon/particle and the atoms in the scintillator. Based on this, it is obvious that, statistically, scintillated or optical photons appear in all directions from the scintillator, independently of the direction of the incident photons or ionizing particles. Since the photomultiplier or photodiode is attached to one end of the scintillator, the maximum detectability of the apparatus is restricted to the portion of optical photons entering the photomultiplier tube or the photodiode. Based on the fact that the surface of a cylinder is described as $2\pi r^2 + 2\pi rh$, r being the radius of the cylinder and h being the height, the portion of optical photons reaching the photomultiplier tube or photodiode, is expressed as $\pi r^2/(2\pi r^2 + 2\pi rh)$, resulting in just 33% detection for a scintillator cylinder with h=r, or 25% detection for a scintillator in which h=2r, or 14% for h=3r. The detection rate reaches 100% only when the cylinder height is set to zero. An is obvious solution to this problem is to place a photomultiplier tube or a photodiode at both ends of the scintillator cylinder. Even though this has the effect of doubling the efficiency, the collection efficiency will stay way below 100%.

SUMMARY OF THE INVENTION

The invention has for its object to remedy or reduce at least one of the drawbacks of the prior art, or at least provide a useful alternative to the prior art.

The object is achieved through features which are specified in the description below and in the claims that follow.

In the further description the expression "photon" is used partly as a collective concept for photons and other ionizing particles.

The invention provides an apparatus which dramatically increases the efficiency of the capturing and detecting of photons in order thereby to offer the user of such equipment increased flexibility, either by being able to perform an operation faster without the statistical quality being impaired, or performing operations with the same consumption of time as earlier, but increasing the data acquisition substantially so as to increase the accuracy of the measuring results. By further enabling directional definition of the point of origin of the incident radiation in the borehole, the user is enabled to create a true 360-degree picture of the wellbore and the surrounding geological materials.

Within the oil and gas industry, especially in density logging, logging while drilling, measuring while drilling and in well logging, it will be very beneficial to be able to increase the detection efficiency for photons in addition to being able to define their incoming direction.

A detection apparatus is provided, exhibiting greater efficiency in the collection and registration of photons that are moving into a cylindrical volume while, at the same time, there is directional definition of the point of origin of the photons. The photons are used as well-logging detectors.

A cylinder-like body with a polygonal peripheral surface is provided. Each peripheral-surface segment comprises a volume of scintillator material which is used to capture ionizing photons which upon creation of optical photons in the scintillator may be registered by a detector, for example an electric charge reader. By means of collimator cells, the peripheral-surface segments are shielded from incident photons which have a direction of motion that deviates from the perpendicular to the surface of said peripheral-surface segment. Thereby information concerning the direction of origin of the incident photons is provided.

The apparatus comprises the following main components:
a. A modular system of detector assemblies arranged in a faceted pattern with the active surface of the detector assemblies mounted tangentially and on attachment arms arranged radially. The detector assemblies are connected to a suitable signal-processing system.
b. A system of screen assemblies which are arranged on the outside of each detector assembly, arranged in such a way that each detector element receives only incident radiation or particles that have a direction perpendicular to the detector assembly.
c. The attachment arms are used as heat conductor means to conduct heat away from the detector assemblies if it is necessary because of unfavourable ambient temperatures.

The invention relates, more specifically, to a detection apparatus for photons or ionizing particles, in which a detector system is provided with several detecting units, each including a scintillator connected to a reader surface on an electronic charge reader, the scintillator being arranged to generate cellular charges on the reader surface when capturing the photons or the ionizing particles, characterized by a collimator being arranged, connected to the scintillator opposite the electronic charge reader, the collimator being arranged to capture photons or ionizing particles exhibiting a direction of motion coinciding with a longitudinal axis of the collimator and to reject photons or ionizing particles exhibiting a direction of motion deviating from the direction of the longitudinal axis of the collimator, and several detector systems being arranged, evenly spaced, around the centre axis of a detector assembly.

The detecting units forming one detector system may have coinciding directions on the longitudinal axes of all the collimators.

Several detector systems may be arranged evenly spaced around and tangentially to an inscribed circle.

The detector systems may be connected to means arranged to conduct heat away from the detector systems to a heat conductor. Preferably, the detector systems are arranged on a detector frame in which the heat conductor forms a supporting structure.

The detection apparatus may be formed of a stack formed of several detector assemblies, each detector assembly having been rotated relative to the adjacent detector assembly/assemblies.

The difference in the rotational angle of two adjacent detector assemblies may be the same for all the detector assemblies of the apparatus.

The electronic charge reader may be a point on an image chip.

The image chip may be taken from the group consisting of CCD, LCD and CMOS chips.

The detector assemblies may be arranged in a fluid-tight rotary body which forms a radio-transparent barrier against a surrounding medium.

The apparatus may include a radiation source arranged remotely from the detector assemblies and separated, in the axial direction of the apparatus, from the detector assemblies by a radiation screen.

BRIEF DESCRIPTION OF THE DRAWINGS

In what follows is described an example of a preferred embodiment which is visualized in the accompanying drawings, in which.

DESCRIPTION OF PREFERRED EMBODIMENTS

Figures 1A, 1B:
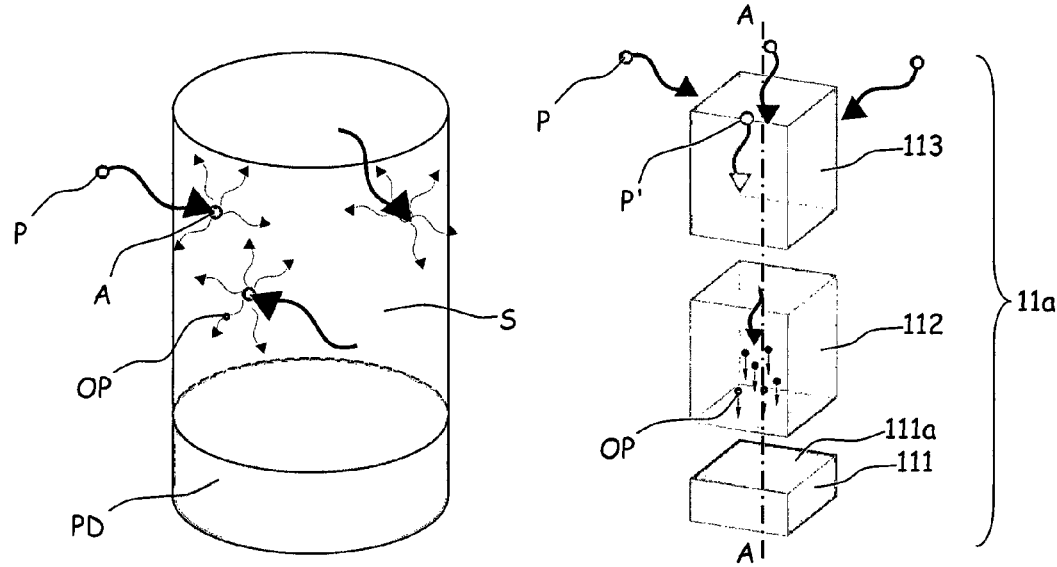
FIG. 1a shows in principle a cylinder body with a prior art photomultiplier or photodiode, in which incident photons interact with atoms in a scintillator so that there is scattering of optical photons.
FIG. 1b shows in principle an exploded detecting unit including a collimator cell in which incident photons are blocked unless they have a direction that corresponds with the axis direction in the collimator cell.

In FIG. 1a which shows schematically a scintillator S in which, according to the prior art, incident photons P having random directions of motion (indicated by large arrows) affect atoms in the scintillator S so that a great many optical photons OP with random directions of motion (indicated by small arrows) are formed. Some optical photons OP reach a receiving surface on a photodiode or photomultiplier tube PD and generate a registration, whereas the other optical photons OP are lost to the surroundings.

In FIG. 1b is shown schematically an exploded detecting unit 11a provided with an electronic charge reader 111, a scintillator 112 and a collimator cell 113 only letting photons P through that have a direction of motion that coincides with a longitudinal axis direction A of the collimator cell 113. Photons P' that have been collimated affect the scintillator material 112, for example cadmium telluride, across which an electric field (not shown) has been set up, and a cascade of photoelectrons OP are formed by the direct-conversion principle, and the photoelectrons OP move in the field direction and are caught on a surface 111a of the electronic charge reader 111. The electronic charge reader 111 may be an image sensor of the CCD, LCD or CMOS type attached to the scintillator 112. In a preferred embodiment, the detector unit 11 is made up of a plurality of such systems, thereby forming a multi-pixel unit. In the further description, the term "detector system" 11, $11_1$-$11_6$ describes a multi-pixel unit.

Figure 3:
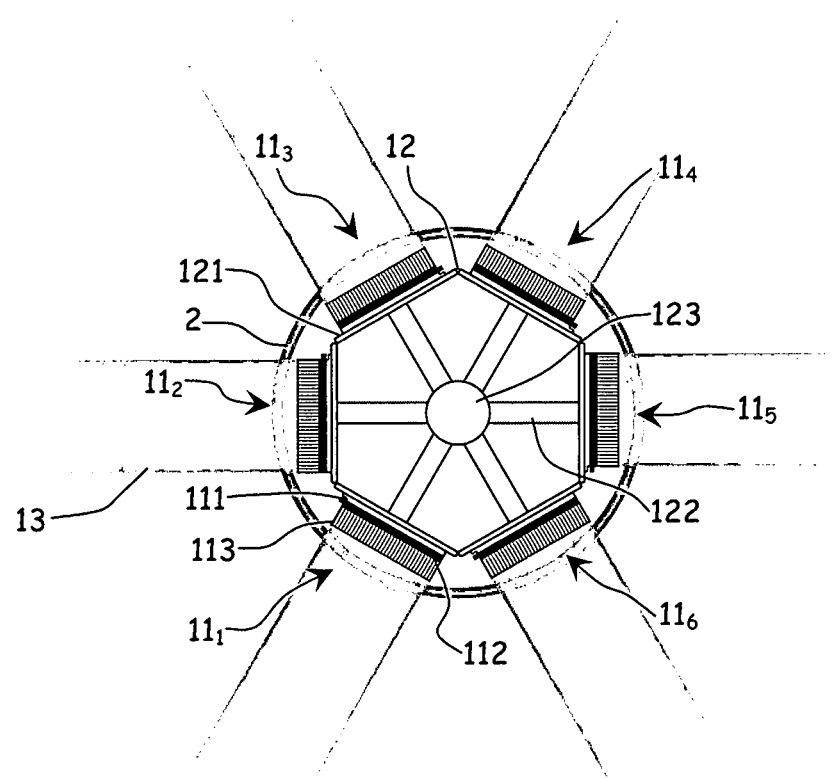
FIG. 3 shows a cross section of a detector assembly made up of six detector systems arranged in a hexagonal structure around a central heat conductor.

A detector assembly 1 (see FIG. 3 in particular) includes a polygonal detector frame 12, here shown as hexagonal, in which, from a heat conductor 123 arranged centrally, several attachment arms 122 extend in radial directions, on which plate-shaped bases 121 are attached in an outer end portion. On each of the bases 121, a detector system $11_1, \ldots, 11_6$ is mounted. Beyond forming a foundation for the detector systems $11_1, \ldots, 11_6$, the detector frame 12 functions as a heat conductor for the detector systems $11_1, \ldots, 11_6$. Each of the detector systems 11 has a detection corridor 13. The heat conductor 123 is arranged on the longitudinal axis B of the apparatus D and the farthest possible away from the areas of the apparatus D that exhibit the highest temperature caused by contact with the well fluid 62. The heat conductor 123 may be cooled with any means available, for example a Peltier element (not shown), to ensure the best possible cooling of the detector systems $11_1, \ldots, 11_6$.

Figure 2:
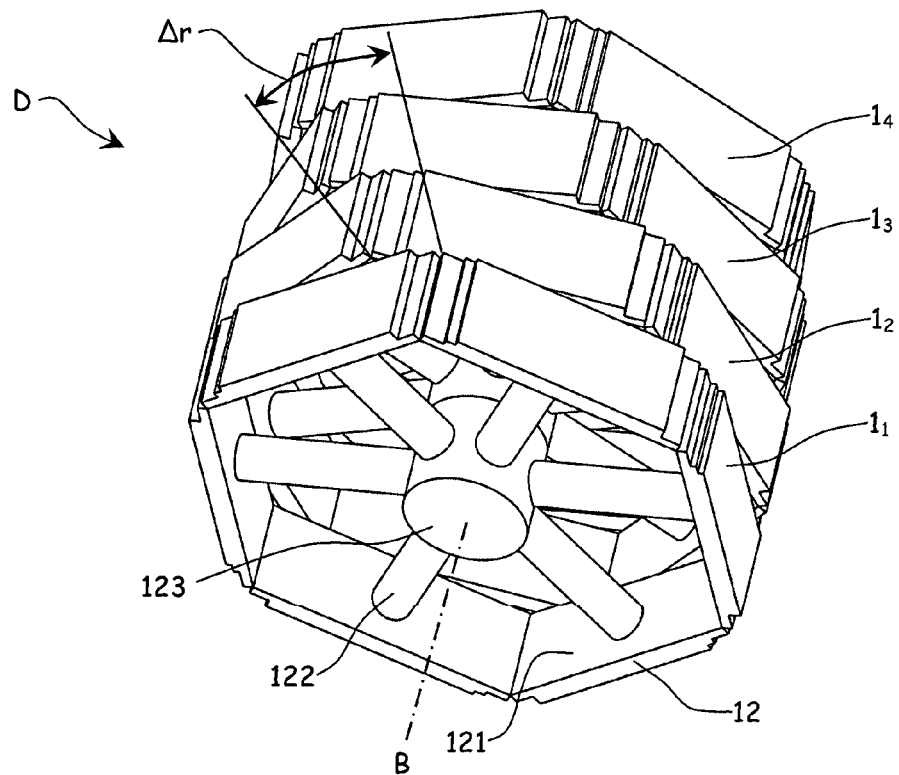
FIG. 2 shows in perspective a stack of several like detector assemblies in which each detector assembly has been rotated relative to the adjacent assembly/assemblies, and in which collimators have been removed for reasons of exposition.

In FIG. 2 a detection apparatus D is shown, provided by four detecting assemblies $1_1$-$1_4$ having been put together into a stack by each of the detecting assemblies $1_1$-$1_4$ having been rotated relative to the adjacent detector assembly/assemblies $1_1$-$1_4$. For reasons of exposition, the collimators 113 have been removed.

Figure 4:
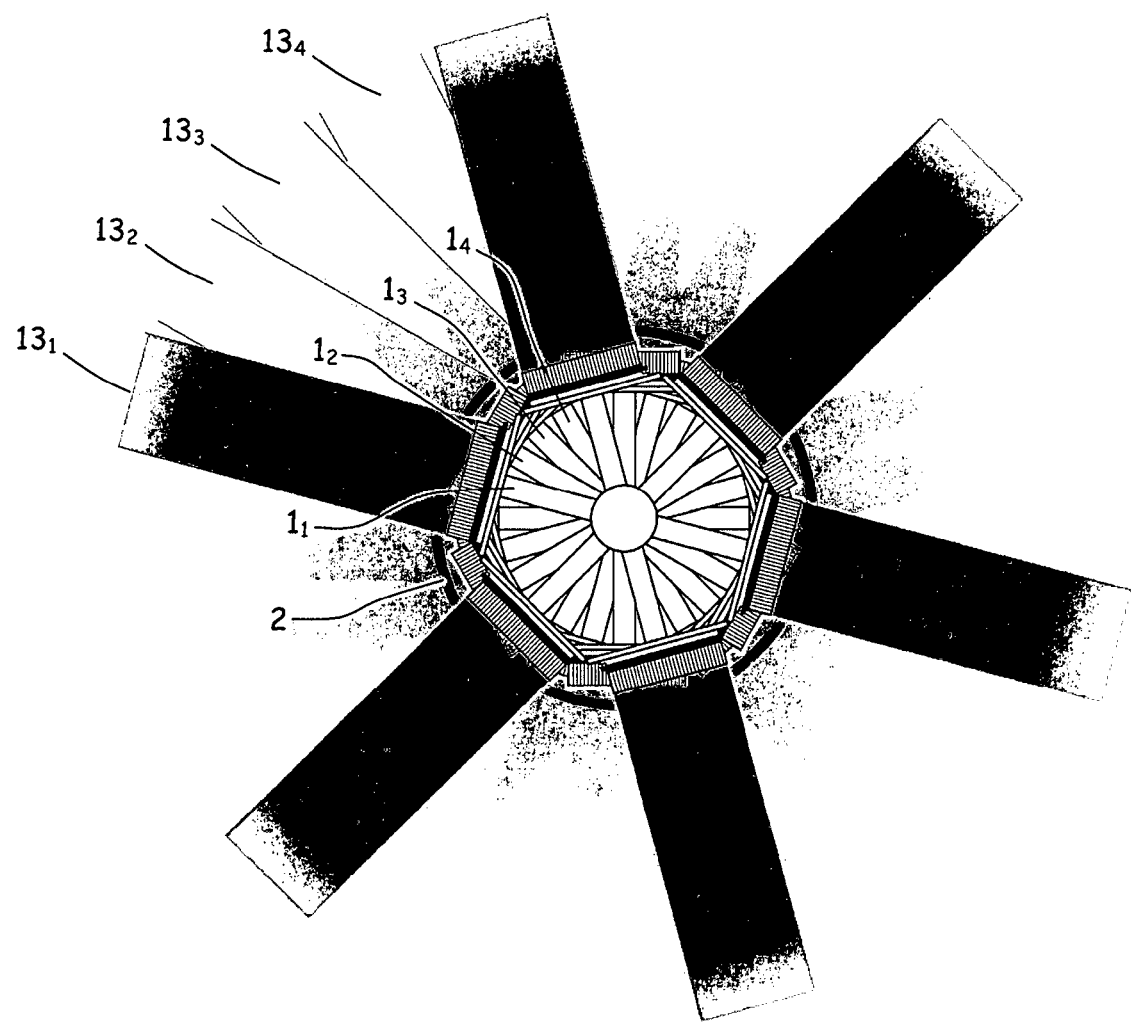
FIG. 4 shows a cutaway end view of the apparatus according to the invention.

In FIG. 4 the total coverage area of the detection apparatus D when it includes four detecting assemblies $1_1$-$1_4$ is shown.

Figure 5:
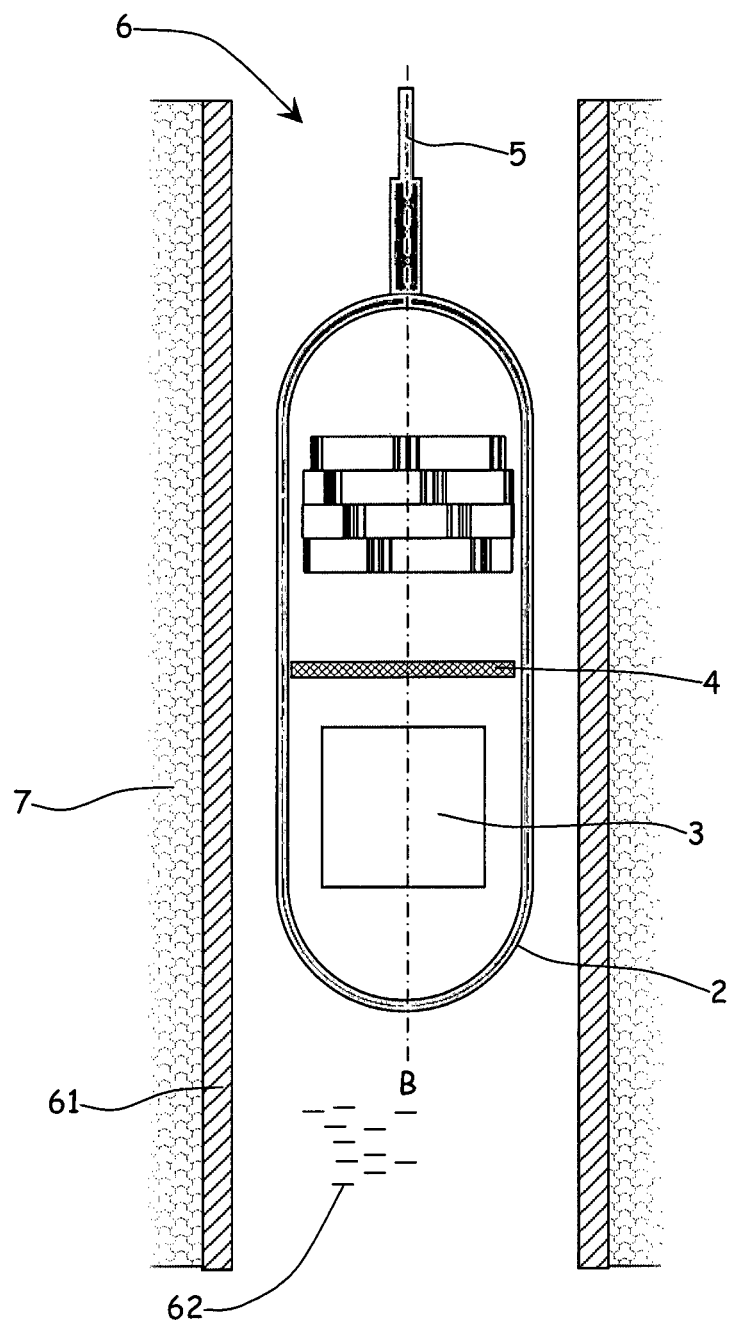
FIG. 5 shows a cutaway of a container accommodating the apparatus together with a radiation source separated from the apparatus by a radiation screen, arranged in a wellbore.

In one embodiment (see FIG. 5), the apparatus D is arranged rotationally symmetrically around the longitudinal axis B in a container 2 forming a radio-transparent barrier between a well fluid 62 held in a wellbore 6 in which the apparatus D with its container 2 has been positioned for logging. The wellbore 6 is defined in a manner known per se against the underground structure 7 by means of a casing 61. The container 2 appropriately includes an artificial radiation source 3. Between the radiation source 3 and the apparatus D, a radiation screen 4 is arranged, and a signal transmission cable 5 connects the apparatus D and a surface installation (not shown), among other things.

When ionizing photons P are reflected from the casing 61, the well fluid 62, or the underground structure 7 and pass through the radio-transparent container 2, they will be admitted through the collimator 113 or rejected, depending on the direction of motion of the photon P. If the direction coincides with the longitudinal axis A of the collimator 113, the photon P will pass, otherwise it will be barred by a process of scatterings from the structure of the collimator 113 which is formed, in a preferred embodiment, of tungsten or another material or material composition with a high atomic number.

Non-barred, incident (collimated) photons P' affect the scintillator 112 to which an electric field has been applied. In a preferred embodiment, cadmium telluride is used as it exhibits the property of dipolarizing electrons from one end of the structure to another when an electric field is being applied to it. In that way, electrons that accumulate near the surface of the scintillator 112 may create an electronic "hole" on the opposite side of the crystal. When an incident, ionizing photon P' meets the scintillator 112, a great many electrons are liberated, moving to the "deficit side", where they are deposited on the reader surface 111a of the electronic charge reader 111 which is in close contact with the scintillator 112. Even though cadmium telluride is used in the preferred exemplary embodiment, any substrate that can provide electronic dipolarization and photon capture may be used. As the magnitude of the cellular charge that is deposited on the surface 111a of the electronic charge reader 111 is dependent on the initial energy of the incident photon P', it is possible to determine the energy level of each photon P' captured, in order thereby to perform a spectroscopic measurement by summing data from several incident photons P'.

The electronic charge reader 111, which is of the CMOS type in a preferred exemplary embodiment, but also may be of the CCD or LDC type, is activated electronically many times per second as electrons, which have accumulated on the surface 111a because of photon capture, are being drawn away. The resulting reading is logged locally in a data set of corresponding time registration logs on a storage medium (not shown) which forms part of a signal-processing system (not shown) of a kind known per se arranged to identify each detecting unit and each reading.

Each detecting unit 11a, which is constituted by a set of an electronic charge reader 111, a scintillator 112, and a collimator 113, represents all together a single pixel in a two-dimensional assembly of many such pixels, together forming a detecting system $11_1, \ldots, 11_6$.

By stacking the detector assemblies $1_1$-$1_4$ in the longitudinal direction of the detection apparatus D and rotated relative to each other around the longitudinal axis, a mutual rotational angle Δr is achieved between the detector assemblies $1_1$-$1_4$. Thereby a large overall detection area is achieved, within which the detection of photons and particles having a radial direction which does not coincide with one of the collimators 113 is eliminated, and the radial direction of the point of origin of the incident collimated photons P' is thereby defined.

What is claimed is:

1. A detection apparatus for photons or ionizing particles, in which a detector system is provided with several detecting units, each including a scintillator connected to a reader surface on an electronic charge reader, the scintillator being arranged to generate cellular charges on the reader surface when capturing the photons or the ionizing particles, and in which, connected to the scintillator opposite the electronic charge reader, a collimator is arranged, which is arranged to capture photons or ionizing particles exhibiting a direction of motion coinciding with a longitudinal axis of the collimator, and to reject photons or ionizing particles exhibiting a direction of motion deviating from the direction of the longitudinal axis of the collimator, and several detector systems being arranged evenly spaced around the centre axis of a detector assembly, wherein the detection apparatus is formed of a stack formed of several detector assemblies, each detector assembly having been rotated around the centre axis of the detector assembly relative to the adjacent detector assembly/assemblies.

2. The detection apparatus in accordance with claim 1, wherein the detecting units forming a detector system have coinciding directions on the longitudinal axes of all the collimators.

3. The detection apparatus in accordance with claim 2, wherein the detector systems are arranged evenly spaced around and tangentially to an inscribed circle.

4. The detection apparatus in accordance with claim 1, wherein the detector systems are connected to means arranged to conduct heat away from the detector systems and to a thermally conductive structure.

5. The detection apparatus in accordance with claim 1, wherein the detector systems are arranged on a detector frame in which the thermally conductive structure forms a supporting structure.

6. The detection apparatus in accordance with claim 5, wherein the difference in the rotational angle of two adjacent detector assemblies is equal for all the detector assemblies in the detection apparatus.

7. The detection apparatus in accordance with claim 1, wherein the electronic charge reader is a point on an image chip.

8. The detection apparatus in accordance with claim 7, wherein the image chip is taken from the group consisting of CCD, LCD and CMOS chips.

9. The detection apparatus in accordance with claim 1, wherein the detector assemblies are arranged in a fluid-tight rotary body which forms a radio-transparent barrier against a surrounding medium.

10. The detection apparatus in accordance with claim 1, wherein the apparatus further includes a radiation source arranged remotely from the detector assemblies and separated, in the axial direction of the apparatus, from the detector assemblies by a radiation screen.

* * * * *